United States Patent Office 3,165,555
Patented Jan. 12, 1965

3,165,555
POLYHALOBICYCLOALKENIC DERIVATIVES OF SALICYLALDEHYDES
John P. Luvisi, Park Ridge, Ill., assignor to Universal Oil Products Company, Des Plaines, Ill., a corporation of Delaware
No Drawing. Filed May 18, 1960, Ser. No. 29,822
6 Claims. (Cl. 260—600)

This application is a continuation-in-part of my copending application Serial No. 655,195, filed April 26, 1957, now abandoned.

This invention relates to new compositions of matter which are useful as insecticides and to a method for the preparation thereof. More specifically, the invention relates to a method for the preparation of polyhalobicycloalkenic derivatives of salicylaldehydes.

An object of this invention is to prepare novel compositions of matter comprising polyhalobicycloalkenic derivatives of salicylaldehydes.

A further object of this invention is to prepare novel compositions of matter possessing insecticidal properties.

One embodiment of this invention resides in a process for the production of a polyhalobicycloalkenic derivative of a salicylaldehyde which comprises condensing an alkenyl salicyladehyde having the generic formula:

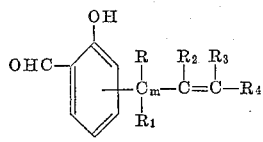

in which the R's are radicals selected from the group consisting of hydrogen and alkyl radicals containing from 1 to 6 carbon atoms and $m$ is an integer of from 0 to 6 with a polyhalocycloalkadiene having the generic formula:

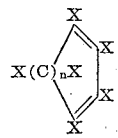

in which the X's are radicals selected from the group consisting of hydrogen and halogen radicals, at least 2 of the X's being halogen radicals and $n$ is an integer of from 1 to 2, at a temperature in the range of from about atmospheric to about 300° C. and at a pressure in the range of from about atmospheric to about 100 atmospheres to form the desired polyhalobicycloalkenic derivative of a salicylaldehyde.

Another embodiment of this invention is found in a process for the production of a polyhalobicycloalkenic derivative of a salicylaldehyde which comprises condensing an alkenyl salicylaldehyde having the generic formula:

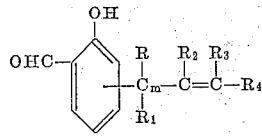

in which the R's are radicals selected from the group consisting of hydrogen and alkyl radicals containing from 1 to 6 carbon atoms and $m$ is an integer of from 0 to 6, with hexachlorocyclopentadiene at a temperature in the range of from about 100° to about 225° C. and at a pressure in the range of from about atmospheric to about 100 atmospheres to form the desired hexachlorobicycloheptenic derivative of a salicylaldehyde.

A specific embodiment of the invention is found in a process for the production of a polyhalobicycloalkenic derivative of a salicylaldehyde which comprises condensing hexachlorocyclopentadiene with 3-methallylsalicylaldehyde at a temperature in the range of from about 100° to about 225° C. and at a pressure in the range of from about atmospheric to about 100 atmospheres to form the desired 3-(1,4,5,6,7,7-hexachloro-2-methylbicyclo[2.2.1]-5-hepten-2-yl)methylsalicylaldehyde.

Yet another embodiment of the invention resides in a polyhalobicycloalkenic derivative of a salicylaldehyde having the generic formula:

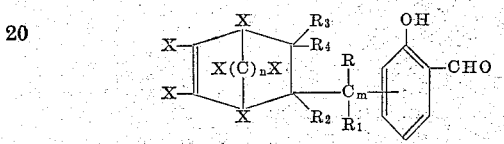

in which the R's are radicals selected from the group consisting of hydrogen and alkyl radicals containing from 1 to 6 carbon atoms, the X's are radicals selected from the group consisting of hydrogen and halogen radicals, at least 2 X's being halogen, $n$ is an integer of from 1 to 2 and $m$ is an integer of from 0 to 6.

Another specific embodiment of the invention is 3-(1,4,5,6,7,7 - hexachlorobicyclo[2.2.1] - 5 - hepten - 2 - yl)salicylaldehyde.

Other objects and embodiments referring to alternative polyhalocycloalkadienes and to alternative alkenyl solicylaldehydes will be found in the following further detailed description of the invention.

It has now been discovered that polyhalobicycloalkenic derivatives of salicylaldehydes which are prepared by condensing a polyhalocycloalkadiene with an alkenyl salicylaldehyde find a wide variety of use in the chemical field. For example, the condensation product of hexachlorocyclopentadiene and 3-allylsalicylaldehyde may be used as an insecticide, especially against houseflies. In addition, the reaction products of this invention may also be used as oxidation inhibitors or as intermediates in the preparation of resins, pharmaceuticals, plastics, etc.

The process of this invention in which the polyhalocycloalkadiene is condensed with an alkenyl salicylaldehyde will take place at a temperature in the range of from about atmospheric to about 300° C. or more and often preferably at a temperature in the range of from about 100° to about 225° C., the temperature depending upon the reactants which are to be condensed. Generally, the reaction will take place at atmospheric pressure; however, if higher temperatures are to be employed, superatmospheric pressures ranging from about 2 to about 100 atmospheres will be used, the amount of pressure being necessary to maintain at least a portion of the reactants in the liquid phase. In addition, the reaction will take place in the presence of inert organic solvents including aromatic solvents such as benzene, toluene, o-, m- and p-xylene, ethylbenzenes, etc.; alcohols such as methyl alcohol, ethyl alcohol, propyl alcohol, etc.; ethers such as dimethyl ether, dipropyl ether, etc.; saturated aliphatic hydrocarbons such as pentane, hexane, heptane, etc.; or acetone, acetic acid, etc.

Alkenyl salicylaldehydes containing only carbon, hydrogen and oxygen atoms which may be used in this invention are those having the general formula:

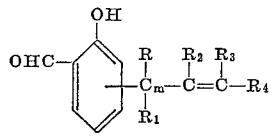

in which the R's independently represent hydrogen or an alkyl radical containing from 1 to 6 carbon atoms and $m$ is an integer from 0 to 6, suitable compounds including 3-vinylsalicylaldehyde,
3-allylsalicylaldehyde,
3-methallylsalicylaldehyde,
3-crotonylsalicyladehyde,
3-pentenylsalicylaldehyde,
3-(1-methyl-4-pentenyl)salicylaldehyde,
3-(2-methyl-4-pentenyl)salicylaldehyde,
3-(3-methyl-4-pentenyl)salicylaldehyde,
3-(1,2-dimethyl-4-pentenyl)salicylaldehyde,
3-(2,3-dimethyl-4-pentenyl)salicylaldehyde,
3-(1-methyl-3-pentenyl)salicylaldehyde,
3-(2-methyl-3-pentenyl)salicylaldehyde,
3-(3-methyl-3-pentenyl)salicylaldehyde,
3-(1,2-dimethyl-3-pentenyl)salicylaldehyde,
3-(2,3-dimethyl-3-pentenyl)salicylaldehyde,
3-(1-methyl-2-pentenyl)salicylaldehyde,
3-(2-methyl-2-pentenyl)salicylaldehyde,
3-(3-methyl-2-pentenyl)salicylaldehyde,
3-(1,2-dimethyl-2-pentenyl)salicylaldehyde,
3-(2,3-dimethyl-2-pentenyl)salicyaldehyde,
3-(3-hexenyl)salicylaldehyde,
3-(4-hexenyl)salicylaldehyde,
3-(5-hexenyl)salicylaldehyde,
3-(1-methyl-3-hexenyl)salicylaldehyde,
3-(2-methyl-3-hexenyl)salicylaldehyde,
3-(3-methyl-3-hexenyl)salicylaldehyde,
3-(4-methyl-3-hexenyl)salicylaldehyde,
3-(5-methyl-3-hexenyl)salicylaldehyde,
3-(1-methyl-4-hexenyl)salicylaldehyde,
3-(2-methyl-4-hexenyl)salicylaldehyde,
3-(3-methyl-4-hexenyl)salicylaldehyde,
3-(4-methyl-4-hexenyl)salicylaldehyde,
3-(5-methyl-4-hexenyl)salicylaldehyde,
3-(1-methyl-5-hexenyl)salicylaldehyde,
3-(2-methyl-5-hexenyl)salicylaldehyde,
3-(3-methyl-5-hexenyl)salicylaldehyde,
3-(4-methyl-5-hexenyl)salicylaldehyde,
3-(5-methyl-5-hexenyl)salicylaldehyde,
3-(1-heptenyl)salicylaldehyde,
3-(2-heptenyl)salicylaldehyde
3-(3-heptenyl)salicylaldehyde,
3-(4-heptenyl)salicylaldehyde,
3-(5-heptenyl)salicylaldehyde,
3-(1-methyl-1-heptenyl)salicylaldehyde,
3-(2-methyl-1-heptenyl)salicylaldehyde,
3-(3-methyl-1-heptenyl)salicylaldehyde,
3-(4-methyl-1-heptenyl)salicylaldehyde,
3-(5-methyl-1-heptenyl)salicylaldehyde,
3-(6-methyl-1-heptenyl)salicylaldehyde,
3-(1-methyl-2-heptenyl)salicylaldehyde,
3-(2-methyl-2-heptenyl)salicylaldehyde,
3-(3-methyl-2-heptenyl)salicylaldehyde,
3-(4-methyl-2-heptenyl)salicylaldehyde,
3-(5-methyl-2-heptenyl)salicylaldehyde,
3-(6-methyl-2-heptenyl)salicylaldehyde,
3-(1-methyl-3-heptenyl)salicylaldehyde,
3-(2-methyl-3-heptenyl)salicylaldehyde,
3-(3-methyl-3-heptenyl)salicylaldehyde,
3-(4-methyl-3-heptenyl)salicylaldehyde,
3-(5-methyl-3-heptenyl)salicylaldehyde,
3-(6-methyl-3-heptenyl)salicylaldehyde,
3-(1-methyl-4-heptenyl)salicylaldehyde,
3-(2-methyl-4-heptenyl)salicylaldehyde,
3-(3-methyl-4-heptenyl)salicylaldehyde,
3-(4-methyl-4-heptenyl)salicylaldehyde,
3-(5-methyl-4-heptenyl)salicylaldehyde,
3-(6-methyl-4-heptenyl)salicylaldehyde,
3-(1-methyl-5-heptenyl)salicylaldehyde,
3-(2-methyl-5-heptenyl)salicylaldehyde,
3-(3-methyl-5-heptenyl)salicylaldehyde,
3-(4-methyl-5-heptenyl)salicylaldehyde,
3-(5-methyl-5-heptenyl)salicylaldehyde,
3-(6-methyl-5-heptenyl)salicylaldehyde,
3-(1-methyl-6-heptenyl)salicylaldehyde,
3-(2-methyl-6-heptenyl)salicylaldehyde,
3-(3-methyl-6-heptenyl)salicylaldehyde,
3-(4-methyl-6-heptenyl)salicylaldehyde,
3-(6-methyl-6-heptenyl)salicylaldehyde, etc.,
4-vinylsalicylaldehyde,
4-allylsalicylaldehyde,
4-methallylsalicylaldehyde,
4-crotonylsalicylaldehyde,
4-pentenylsalicylaldehyde,
4-(2-methyl-4-pentenyl)salicylaldehyde,
4-(2,3-dimethyl-4-pentenyl)salicylaldehyde,
4-(2-methyl-3-pentenyl)salicylaldehyde,
4-(3-methyl-3-pentenyl)salicylaldehyde,
4-(3-methyl-2-pentenyl)salicylaldehyde,
4-(4-hexenyl)salicylaldehyde,
4-(1-methyl-3-hexenyl)salicylaldehyde,
4-(3-methyl-3-hexenyl)salicylaldehyde,
4-(4-methyl-3-hexenyl)salicylaldehyde,
4-(2-methyl-4-hexenyl)salicylaldehyde,
4-(5-methyl-4-hexenyl)salicylaldehyde,
4-(3-methyl-5-hexenyl)salicylaldehyde,
4-(4-methyl-5-hexenyl)salicylaldehyde,
4-(5-methyl-5-hexenyl)salicylaldehyde,
4-(4-heptenyl)salicylaldehyde,
4-(5-heptenyl)salicylaldehyde,
4-(2-methyl-1-heptenyl)salicylaldehyde,
4-(4-methyl-1-heptenyl)salicylaldehyde,
4-(6-methyl-1-heptenyl)salicylaldehyde,
4-(2-methyl-2-heptenyl)salicylaldehyde,
4-(4-methyl-2-heptenyl)salicylaldehyde,
4-(6-methyl-2-heptenyl)salicylaldehyde,
4-(2-methyl-3-heptenyl)salicylaldehyde,
4-(4-methyl-3-heptenyl)salicylaldehyde,
4-(6-methyl-3-heptenyl)salicylaldehyde,
4-(2-methyl-4-heptenyl)salicylaldehyde,
4-(4-methyl-4-heptenyl)salicylaldehyde,
4-(5-methyl-4-heptenyl)salicylaldehyde,
4-(1-methyl-5-heptenyl)salicylaldehyde,
4-(3-methyl-5-heptenyl)salicylaldehyde,
4-(5-methyl-5-heptenyl)salicylaldehyde,
4-(1-methyl-6-heptenyl)salicylaldehyde,
4-(3-methyl-6-heptenyl)salicylaldehyde,
4-(5-methyl-6-heptenyl)salicylaldehyde,
5-vinylsalicylaldehyde,
5-allylsalicylaldehyde,
5-methallylsalicylaldehyde,
5-crotonylsalicylaldehyde,
5-pentenylsalicylaldehyde,
5-(2-methyl-4-pentenyl)salicylaldehyde,
5-(2,3-dimethyl-4-pentenyl)salicylaldehyde,
5-(2-methyl-3-pentenyl)salicylaldehyde,
5-(3-methyl-3-pentenyl)salicylaldehyde,
5-(3-methyl-2-pentenyl)salicylaldehyde,
5-(4-hexenyl)salicylaldehyde,
5-(1-methyl-3-hexenyl)salicylaldehyde,
5-(3-methyl-3-hexenyl)salicylaldehyde,
5-(4-methyl-3-hexenyl)salicylaldehyde,
5-(2-methyl-4-hexenyl)salicylaldehyde,
5-(5-methyl-4-hexenyl)salicylaldehyde, 5-(3-methyl-5-hexenyl)salicylaldehyde,
5-(4-methyl-5-hexenyl)salicylaldehyde,
5-(5-methyl-5-hexenyl)salicylaldehyde,
5-(4-heptenyl)salicylaldehyde,
5-(5-heptenyl)salicylaldehyde,
5-(2-methyl-1-heptenyl)salicylaldehyde,
5-(4-methyl-1-heptenyl)salicylaldehyde,
5-(6-methyl-1-heptenyl)salicylaldehyde,
5-(2-methyl-2-heptenyl)salicylaldehyde,
5-(4-methyl-2-heptenyl)salicylaldehyde,
5-(6-methyl-2-heptenyl)salicylaldehyde,
5-(2-methyl-3-heptenyl)salicylaldehyde,
5-(4-methyly-3-heptenyl)salicylaldehyde,
5-(6-methyl-3-heptenyl)salicylaldehyde,
5-(2-methyl-4-heptenyl)salicylaldehyde,
5-(4-methyl-4-heptenyl)salicylaldehyde,
5-(5-methyl-4-heptenyl)salicylaldehyde,
5-(1-methyl-5-heptenyl)salicylaldehyde,
5-(3-methyl-5-heptenyl)salicylaldehyde,
5-(5-methyl-5-heptenyl)salicylaldehyde,
5-(1-methyl-6-heptenyl)salicylaldehyde,
5-(3-methyl-6-heptenyl)salicylaldehyde,
5-(5-methyl-6-heptenyl)salicylaldehyde, etc.

It is to be understood that the aforementoned alkenyl salicylaldehydes are only representatives of the class of compounds which may be used, and that the process of this invention is not necessarily limited thereto. In addition it is also contemplated within the scope of this invention that alkenyl salicylaldehydes containing other substituents, such as haloalkyl, nitro, halo, cyano, etc., radicals, on the nuclear ring may also be used although not necessarily with equivalent results.

Polyhalocycloalkadienes containing only carbon, hydrogen and halogen atoms which may be condensed with the aforementioned alkenyl salicylaldehydes possess the generic formula

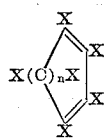

in which the X's comprise either hydrogen or a halogen radical having an atomic weight of between 35 and 80 (i.e. chlorine and bromine), at least 2 of the X's being halogen. Specific examples of these polyhalocycloalkadienes include 1,2-dichlorocyclopentadiene,
1,2,3-trichlorocyclopentadiene,
1,2,3,4-tetrachlorocyclopentadiene,
1,2,3,4,5-pentachlorocyclopentadiene,
hexachlorocyclopentadiene,
1,2-dibromocyclopentadiene,
1,2,3-tribromocyclopentadiene,
1,2,3,4-tetrabromocyclopentadiene,
1,2,3,4,5-pentabromocyclopentadiene,
hexabromocyclopentadiene,
1,2-difluorocyclopentadiene,
1,2,3-trifluorocyclopentadiene,
1,2,3,4-tetrafluorocyclopentadiene,
1,2,3,4,5-pentafluorocyclopentadiene,
hexafluorocyclopentadiene, etc.

Polyhalo substituted conjugated cyclohexadienes such as 1,2-dichloro-1,3-cyclohexadiene, 1,2,3-dichloro-1,3-cyclohexadiene, octachloro-1,3-cyclohexadiene, etc., 1,2-dibromo-1,3-cyclohexadiene, octabromo-1,3-cyclohexadiene, etc., may also be used. However, the preferred polyhalocycloalkadiene comprises a polyhalocyclopentadiene due to its greater availability and relatively lesser cost. In addition, it is also contemplated within the scope of this invention that the polyhalocycloalkadienes which are used in this process may contain more than one species of halogen substituents such as, for example, 1-chloro-2-bromocyclopentadiene, 1,2-dichloro-3-bromocyclopentadiene, 1,2-dichloro-5,5-dibromocyclopentadiene, etc., although the use of these compounds are not necessarily for equivalent results.

An example of the condensation reaction of the present process may be illustrated by the following equation in which an alkenyl salicylaldehyde is condensed with a polyhalocycloalkadiene to form a polyhalobicycloalkenic derivative of a salicylaldehyde. In this equation the R's, X's, m and n possess the same meanings as hereinbefore set forth.

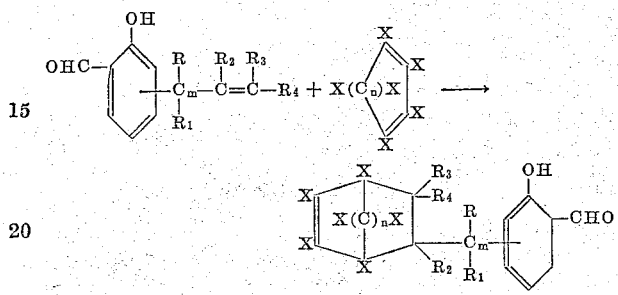

A specific example of the condensation reaction is the reaction between 3-allylsalicylaldehyde and hexachlorocyclopentadiene to form 3-(1,4,5,6,7,7-hexachlorobicyclo-[2.2.1]-5-hepten-2-yl)methylsalicylaldehyde.

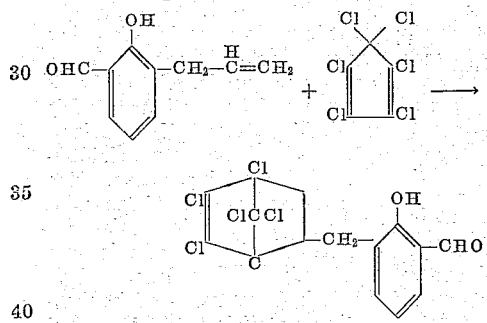

The physical properties of the present polyhalobicycloalkenic derivatives of salicylaldehydes and the effects they have on entomological forms of life make them particularly desirable as insecticides and insect repellents, the compounds having many of the features desired of materials of this purpose. They are, for example, toxic to insects which are destructive to plant life and materials normally subject to insect infestation, their toxic effects being manifested by contact of the poison with the insect. The insecticides comprising the present compound are thus effective against chewing as well as sucking types of insects. The compounds are sufficiently volatile so that when applied to plant life intended for subsequent human consumption, the plants when harvested and after allowing a reasonable time for evaporation of the applied insecticide therefrom retain none of the toxicant to prevent use of the plant for consumption as food. On the other hand, the compounds are of sufficiently limited volatility to be retained on the insect for the time required to accomplish the toxic effects of the compounds. The volatility and retentive capacity of the compounds may be varied at will by combining them with suitable fixing agents which reduce or promote their volatilization, as desired. Thus, the compounds may be dissolved in a suitable high boiling solvent, such as a mineral or vegetable oil, petroleum, etc.; a wax, such as paraffin wax, beeswax, etc.; a high molecular weight alcohol or ether such as myricyl alcohol, dibutyl ether, etc.; or they may be emulsified with water by the addition of an emulsifying agent, such as surface active agent, to the mixture of components. The latter solvents and dispersants may also be employed for the specific purpose of reducing the concentration of insecticide to the desired level in a specific insecticide formulation, the particular formulation of active components in combination with the solvent or dispersant will depend upon its application. Compositions containing as high as 20% of active component may be preferred, in some instances where deep penetration of the insecticide is desired, as in the treatment of fibrous material, such as wood, for extinction of a particular infestation, for example, wood termites. For other purposes, the required concentration of active components in the formulation may be as low as 0.1%, as for example in the treatment of fabrics for destroying moth larvae. In utilizing the present insecticidal compounds against most insects, a composition containing from about 0.1% to about 5% by weight of the active component is highly effective. The choice of the most desirable solvent or dispersant further depends upon the method utilized to apply the insecticidal composition to the infested article. For example, a low molecular weight, normally gaseous carrying agent for the active insecticidal component, such as propane, butane, the Freons, etc., may be compressed and liquefied into a small bomb containing the insecticide. Upon release of pressure from the bomb, the liquefied carrier vaporizes and suspends a quantity of the active component therein, thus providing a convenient spraying method of applying the insecticide. The active component may also be dissolved in a liquid carrier, such as kerosene, an alcohol, ester, ketone, etc., and the resulting solution atomized by a suitable spraying device.

The process of the present invention may be effected in any suitable manner and may comprise either a batch or a continuous type operation. For example, when a batch type operation is used, a quantity of the starting materials comprising an alkenyl salicylaldehyde and, if so desired, an inert organic solvent are placed in a condensation apparatus provided with heating and mixing means. The flask is adjusted to the desired temperature and the polyhalocycloalkadiene is added at a predetermined rate for a predetermined residence time. At the end of this time the flask and contents thereof, are allowed to cool to room temperature and the desired reaction product separated from unreacted starting materials by conventional means such as fractional distillation, crystallization, etc. Alternatively, the reactants and solvent, if any, may be mixed and then heated to the desired reaction temperature.

Another method of effecting the condensation reaction of the present invention is by a continuous type operation. In this type of operation the starting materials comprising the alkenyl salicylaldehyde and the polyhalocycloalkadiene are continuously charged to a reactor which is maintained at the proper operating conditions of temperature and pressure. The reactor may comprise an unpacked vessel or coil or may contain an adsorbent packing material such as fire brick, alumina, dehydrated bauxite, or the like. If so desired, an inert organic solvent of the type hereinbefore set forth may be added through a separate line or admixed with one or the other of the starting materials prior to entry into said reactor and charged thereto in a single line. The reaction product is continuously withdrawn from the reactor, separated from the reactor effluent and purified by conventional means hereinbefore set forth, while the unreacted starting materials are separated and recharged to the reactor as a portion of the feed stock.

The following examples are given to illustrate the process of the present invention which, however, are not intended to limit the generally broad scope of the present invention in strict accordance therewith.

*Example I*

A mixture of 27 g. (0.1 mole) of hexachlorocyclopentadiene and 16 g. (0.1 mole) of 3-allylsalicylaldehyde dissolved in 50 g. of toluene was refluxed at a temperature of about 110° C. for a period of 5½ hours during which time the inert solvent, toluene, was distilled over until the reaction temperature reached a maximum of 205° C. The reaction vessel and contents thereof were cooled to room temperature and the reaction product was recovered, washed, dried and distilled under reduced pressure. Eleven grams of a viscous liquid product boiling at approximately 390° C. was recovered, said liquid crystallizing upon standing. The product was recrystallized from alcohol and subjected to a melting point determination. The purified product comprising 3-(1,4,5,6,7,7-hexachlorobicyclo[2.2.1] - 5 - hepten-2 - yl)methylsalicylaldehyde, having a melting point of 101° C. The reaction product was characterized by its solubility in Claisen's solution (aqueous methanolic potassium hydroxide), the solution exhibiting a bright yellow color. In addition it was also slightly soluble in 20% sodium hydroxide solution. This solubility in the basic solution proves the presence of the phenolic group in the reaction product. The presence of a carbonyl group in the reaction product was shown by preparing a 2,4-dinitrophenylhydrazone which melted at 292° C.

The product was analyzed with the following results.
Found: C, 41.61; H, 2.75; Cl, 48.51. Calculated for $C_{15}H_{10}Cl_6O_2$: C, 41.42; H, 2.32; Cl, 48.90.

*Example II*

A solution of 27 g. of hexachlorocyclopentadiene and 15 g. of 3-vinylsalicylaldehyde in 50 g. of xylene is heated under reflux for a period of about 5 hours during which time the xylene is distilled over until the reaction temperature reaches a maximum of about 225° C. At the end of this time the flask and contents thereof are cooled to room temperature and the reaction product is recovered, washed, dried and subjected to fractional distillation under reduced pressure. The desired product, comprising 3-(1,4,5,6,7,7-hexachlorobicyclo[2.2.1]-5-hepten - 2 - yl)salicylaldehyde is separated therefrom.

*Example III*

A solution of 27 g. of hexachlorocyclopentadiene and 17 g. of 3-methallylsalicylaldehyde in 50 g. of toluene is heated under reflux for about 5 hours, after which the product is recovered and treated as described for the product of Examples I and II above. The desired product, comprising 3-(1,4,5,6,7,7-hexachloro-2-methylbicyclo[2.2.1]-5-hepten-2-yl)methylsalicylaldehyde is recovered therefrom.

*Example IV*

A solution of 27 g. of hexachlorocylopentadiene and 17 g. of 3-crotonylsalicylaldehyde in 50 g. of xylene is treated as described in Example I above. The desired product, comprising 3 - (1,4,5,6,7,7 - hexachloro-3-methylbicyclo[2.2.1]-5-hepten-2-yl)methylsalicylaldehyde is recovered by fractional distillation under reduced pressure.

*Example V*

A solution of 30 g. (0.1 mole) of hexabromocyclopentadiene and 15 g. (0.1 mole) of 3-vinylsalicylaldehyde in 50 g. of xylene is heated under reflux for a period of about 5 hours during which time the xylene is distilled off until the reaction temperature reaches a maximum of about 225° C. At the end of this time the flask and contents thereof are cooled to room temperature and the reaction product, comprising 3-(1,4,5,6,7,7-hexabromobicyclo[2.2.1]-5-hepten-2-yl)salicylaldehyde is recovered by fractional distillation under reduced pressure.

*Example VI*

An insecticidal solution is prepared by dissolving 1 g. of 3-(1,4,5,6,7,7-hexachlorobicyclo[2.2.1]-5-hepten-2-yl)methylsalicylaldehyde in 2 cc. of benzene and adding 100 cc. of water using Triton X–100 as an emulsifying agent. This solution is sprayed into a cage containing common houseflies and causes a 100% knock-down.

I claim as my invention:

1. A polyhalobicycloalkenic derivative of a salicylaldehyde having the generic formula:

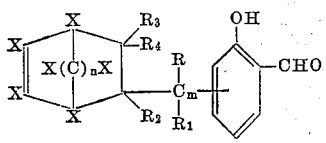

in which the R's are radicals selected from the group consisting of hydrogen and alkyl radicals containing from 1 to 6 carbon atoms, the X's are radicals selected from the group consisting of hydrogen, chlorine and bromine radicals, at least 2 X's being halogen, $m$ is an integer of from 0 to 5 and $n$ is an integer of from 1 to 2, the polyhalobicycloalkenic moiety being in one of the positions 3 to 5 with respect to the formyl radical.

2. 3-(1,4,5,6,7,7-hexachlorobicyclo[2.2.1] - 5 - hepten-2-yl)methylsalicylaldehyde.

3. 3-(1,4,5,6,7,7 - hexachlorobicyclo[2.2.1]-5 - hepten-2-yl)salicylaldehyde.

4. 3-(1,4,5,6,7,7-hexachloro - 2 - methylbicyclo[2.2.1]-5-hepten-2-yl)methylsalicylaldehyde.

5. 3-(1,4,5,6,7,7 - hexachloro - 3 - methylbicyclo[2.2.1]-5-hepten-2-yl)methylsalicylaldehyde.

6. 3-(1,4,5,6,7,7 - hexabromobicyclo[2.2.1] - 5-hepten-2-yl)salicylaldehyde.

References Cited in the file of this patent
UNITED STATES PATENTS

| | | |
|---|---|---|
| 2,721,882 | Schmerling | Oct. 25, 1955 |
| 2,761,879 | Soloway | Sept. 4, 1956 |